(12) United States Patent
Rios et al.

(10) Patent No.: US 9,736,082 B2
(45) Date of Patent: *Aug. 15, 2017

(54) INTELLIGENT HIGH-VOLUME CLOUD APPLICATION PROGRAMMING INTERFACE REQUEST CACHING

(71) Applicant: AT&T INTELLECTUAL PROPERTY I, L.P., Atlanta, GA (US)

(72) Inventors: Roque Rios, Middletown, NJ (US); Amee Fontanetta, Cliffwood Beach, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,219

(22) Filed: Jun. 17, 2016

(65) Prior Publication Data
US 2016/0301625 A1  Oct. 13, 2016

Related U.S. Application Data

(63) Continuation of application No. 14/049,917, filed on Oct. 9, 2013, now Pat. No. 9,401,953.

(51) Int. Cl.
*H04L 12/911* (2013.01)
*H04L 29/08* (2006.01)
*G06F 17/30* (2006.01)
*G06F 9/54* (2006.01)

(52) U.S. Cl.
CPC ............ *H04L 47/783* (2013.01); *G06F 9/547* (2013.01); *G06F 17/30864* (2013.01); *H04L 67/10* (2013.01); *H04L 67/2833* (2013.01); *H04L 67/32* (2013.01)

(58) Field of Classification Search
CPC ...... G06F 9/547; H04L 67/2833; H04L 67/10
See application file for complete search history.

(56) References Cited

U.S. PATENT DOCUMENTS 7,599,986 B2   10/2009  Meeuwissen et al.
8,190,740 B2    5/2012  Stienhans et al.
8,250,215 B2    8/2012  Stienhans et al.
(Continued)

OTHER PUBLICATIONS

Sirisha et al., "API Access Control in Cloud Using the Role Based Access Control Model," 2010.
(Continued)

*Primary Examiner* — Syed Roni
(74) *Attorney, Agent, or Firm* — Akerman LLP; Michael K. Dixon; Mammen (Roy) P. Zachariah, Jr.

(57) ABSTRACT

A system for processing requests handled by an application programming interface is disclosed. The system may receive a plurality of requests which call functions that are hosted by the application programming interface. Once the plurality of requests are received, the system may group a subset of the requests into a pool of requests if the subset of requests call similar functions hosted by the application programming interface. Additionally, the system may combine a set of requests from the pool of requests into a set of calls if the set of requests in the pool of requests are received by the system during a specified time interval. Furthermore, the system may include pushing the set of calls to a database to obtain a result set for the set of requests in the set of calls. The system may then receive the result set in response to the set of calls.

20 Claims, 5 Drawing Sheets

(56) References Cited

U.S. PATENT DOCUMENTS

| | | |
|---|---|---|
| 8,402,139 B2 | 3/2013 | Ferris et al. |
| 2005/0097083 A1 | 5/2005 | Barsness et al. |
| 2010/0131949 A1 | 5/2010 | Ferris |
| 2011/0087731 A1 | 4/2011 | Wong et al. |
| 2011/0125894 A1 | 5/2011 | Anderson et al. |
| 2011/0138055 A1 | 6/2011 | Daly et al. |
| 2011/0145842 A1 | 6/2011 | Tofighbakhsh et al. |
| 2011/0179162 A1 | 7/2011 | Mayo et al. |
| 2012/0005262 A1 | 1/2012 | McWhirter et al. |
| 2012/0072985 A1 | 3/2012 | Davne et al. |
| 2012/0102183 A1 | 4/2012 | Murakami et al. |
| 2012/0102572 A1 | 4/2012 | Murakami et al. |
| 2012/0158821 A1 | 6/2012 | Barros |
| 2012/0311070 A1 | 12/2012 | BianRosa et al. |
| 2012/0331095 A1 | 12/2012 | Morgan et al. |
| 2013/0007265 A1 | 1/2013 | Benedetti et al. |
| 2013/0029726 A1 | 1/2013 | Berionne et al. |
| 2013/0086234 A1 | 4/2013 | Salsburg |
| 2013/0111500 A1 | 5/2013 | Dixon et al. |
| 2013/0138810 A1 | 5/2013 | Binyamin et al. |

OTHER PUBLICATIONS

Gopalakrishnan, "Cloud Computing Identity Management," SETLabs Briefings, v7 n7, 2009.

Hill et al., "CSAL: A Cloud Storage Abstraction Layer to Enable Portable Cloud Applications," 2nd IEEE International Conference on Cloud Computing Technology and Science, 2010.

Soon-Heum et al., "Efficient Runtime Environment for Coupled Multi-Physics Simulations: Dynamic Resource Allocation and Load-Balancing," 2010 10th IEEE/ACM International Conference on Cluster, Cloud and Grid Computing, 2010.

INTELLIGENT HIGH-VOLUME CLOUD APPLICATION PROGRAMMING INTERFACE REQUEST CACHING

CROSS REFERENCE TO RELATED APPLICATIONS

This application is a continuation of and claims priority to U.S. patent application Ser. No. 14/049,917, filed Oct. 9, 2013, now U.S. Pat. No. 9,401,953, which is herein incorporated by reference in its entirety.

FIELD OF THE INVENTION

The present application relates to techniques for processing and handling requests, and more particularly, to a system for providing intelligent high-volume cloud application programming interface request caching.

BACKGROUND

In today's society, end users regularly utilize network and other service providers to gain access to the Internet, access software services, request and receive various types of content, access software applications, place internet-based calls, and perform a variety of other tasks and functions. Some software applications have a large number of end users because the applications and services offer highly popular content and services. In order to handle the large volume of requests associated these end users, such software applications often utilize content distribution networks and systems to serve the content and provide the services to the end users in an effective manner. This is particularly true when high performance, reliability, scalability, and cost savings associated with distributing the content and providing the services are important to the companies that provide the software applications.

With the ever-increasing popularity of cloud computing, various functions and services that would traditionally be directly handled by the software applications that the end users are accessing are being outsourced to cloud application programming interfaces and other systems. Such application programming interfaces and other systems have become very popular and effective means for hosting various functions of software applications, particularly when there are a large number of users making requests. Nevertheless, in current solutions, when large numbers of users send requests to access the same function that is hosted by an application programming interface, the requests are typically placed in a queue with other requests associated with other functions that are also hosted by the application programming interface. After each request is removed from the queue via a given process, whether it be first-in first-out or otherwise, each request may be processed by various processing nodes, and numerous calls may be made to the database containing the information that is responsive to each request.

In order to tackle such a large volume of requests and calls, current solutions often require the use of multiple instances of the same database to handle the congestion created by such requests and calls in an acceptable amount of time. While employing load balancing across multiple, well-indexed databases is a way to mitigate traffic congestion to application programming interface calls, this solution is hardware-based. As a result, in order to further improve the handling of large volumes of requests using traditional solutions, the installation of additional hardware is typically required.

SUMMARY

A system and accompanying methods for processing requests handled by an application programming interface are disclosed. In particular, the system and methods may allow for micro-optimized database use by grouping application programming interface requests based on which functions that each request calls. In order to accomplish this, the application programming interface may receive a plurality of requests from various end users that are using an application that uses the functions that are hosted by the application programming interface. For example, the application programming interface may be utilized by the application to store, retrieve, and manipulate data associated with certain features of the application. When the application programming interface receives the plurality of requests, the application programming interface may group a subset of the requests into a pool of requests if the requests in the subset call the same or similar functions hosted by the application programming interface. Additionally, the application programming interface may assign priorities to the requests based on which functions the requests call.

Once the subset of requests are grouped into a pool of requests, the application programming interface may perform a query optimization by combing a set of requests within the pool of requests that have been received within a specified time interval into a single database call. For example, the application programming interface may combine requests that all call a high score function used by a gaming application into a single database call if the requests were all received within the past one second of time. Once a set of requests within the pool of requests have been combined into a single call, the application programming interface may transmit the single call to a database or other system to obtain a result set for the set of requests in the single call. Identifiers that uniquely identify one request from another may be appended into rows in the result set so as to distinguish a result associated with one request from a result associated with a different request. Now, without having to further access the database, the result set can be split based on the identifiers into individualized responses for each of the requests that were originally served to the application programming interface. The individualized responses may be transmitted to the corresponding devices that made the requests that correspond to the responses.

Such a solution can create tremendous cost savings, particularly when there is a massive population of end users that are sending requests to access a particular application programming interface call in a cloud computing environment. By enabling micro-optimized database use through the grouping of application programming interface requests based on which functions that the requests call and based on the time interval in which the requests were received, the system can effectively reduce the demand for hardware expansion and provide an efficient means for handling requests.

In one embodiment, a system for processing requests handled by an application programming interface is disclosed. The system may include a memory that stores instructions and a processor of a network provider that executes the instructions to perform various operations of the system. The system may receive a plurality of requests that call a plurality of functions that are hosted by the application programming interface. Then, the system may perform an operation that includes grouping a subset of requests of the plurality of requests into a pool of requests if the subset of requests call similar functions of the plurality of functions. If a set of requests in the pool of requests are received during a specified time interval, the system may perform an operation that includes combining the set of requests of the pool of requests into a set of calls numbering less than the number of requests in the set of requests of the pool of requests. In at least one embodiment, the set of requests in the pool of requests may be combined into a single call. The system may then perform an operation that includes transmitting the set of calls to a database to obtain a result set for the set of requests in the set of calls. The result set may be generated based on executing the similar functions. Finally, the system may perform an operation that includes receiving the result set in response to the set of calls.

In another embodiment, a method for processing requests handled by an application programming interface is disclosed. The method may include utilizing a memory that stores instructions, and a processor that executes the instructions to perform the various functions of the method. The method may include receiving a plurality of requests that call a plurality of functions that are hosted by the application programming interface. Additionally, the method may include grouping a subset of requests of the plurality of requests into a pool of requests if the subset of requests call similar functions of the plurality of functions. Also, the method may include combining a set of requests of the pool of requests into a set of calls if the set of requests in the pool of requests are received during a time interval. The number of calls in the set of calls may number less than the number of requests in the set of requests in the pool of requests. In at least one embodiment, the set of requests in the pool of requests may be combined into a single call. Furthermore, the method may include transmitting the set of calls to a database to obtain a result set for the set of requests in the set of calls. The result set may be generated based on execution of the similar functions. Finally, the method may include receiving the result set in response to the set of calls.

According to yet another embodiment, a computer-readable device having instructions for providing differentiated services to traffic flows of a content distribution network is provided. The computer instructions, which when loaded and executed by a processor, may cause the processor to perform operations including: receiving a plurality of requests that call a plurality of functions that are hosted by the application programming interface; grouping a subset of requests of the plurality of requests into a pool of requests if the subset of requests call similar functions of the plurality of functions; combining a set of requests of the pool of requests into a set of calls if the set of requests in the pool of requests are received during a time interval, wherein a number of calls in the set of calls is less than a number of requests in the set of requests of the pool of requests; transmitting the set of calls to a database to obtain a result set for the set of requests in the set of calls, wherein the result set is generated based on the similar functions; and receiving the result set in response to the set of calls.

These and other features of the systems and methods for processing requests handled by an application programming interface are described in the following detailed description, drawings, and appended claims.

DETAILED DESCRIPTION OF THE INVENTION

A system 100 and accompanying methods for processing requests handled by an application programming interface (API) 120 are disclosed, as shown in FIGS. 1-5. In particular, the system 100 and methods may allow for micro-optimized database use by grouping API requests based on which functions that each request calls. End users that are using an application 110 that utilizes functions hosted by the API 120 may send the plurality of requests to the API 120 via the application 110. The API 120, for example, may be utilized by the application 110 to store, retrieve, and manipulate data associated with the application 110. Once the API 120 receives the plurality of requests from the end users, the system 100 may group a subset of the requests into a pool of requests if the requests in the subset call the same functions or similar functions hosted by the API 120. In certain embodiments, the system 100 may assign a priority level to each of the requests based on which function each request calls.

Figure 1:
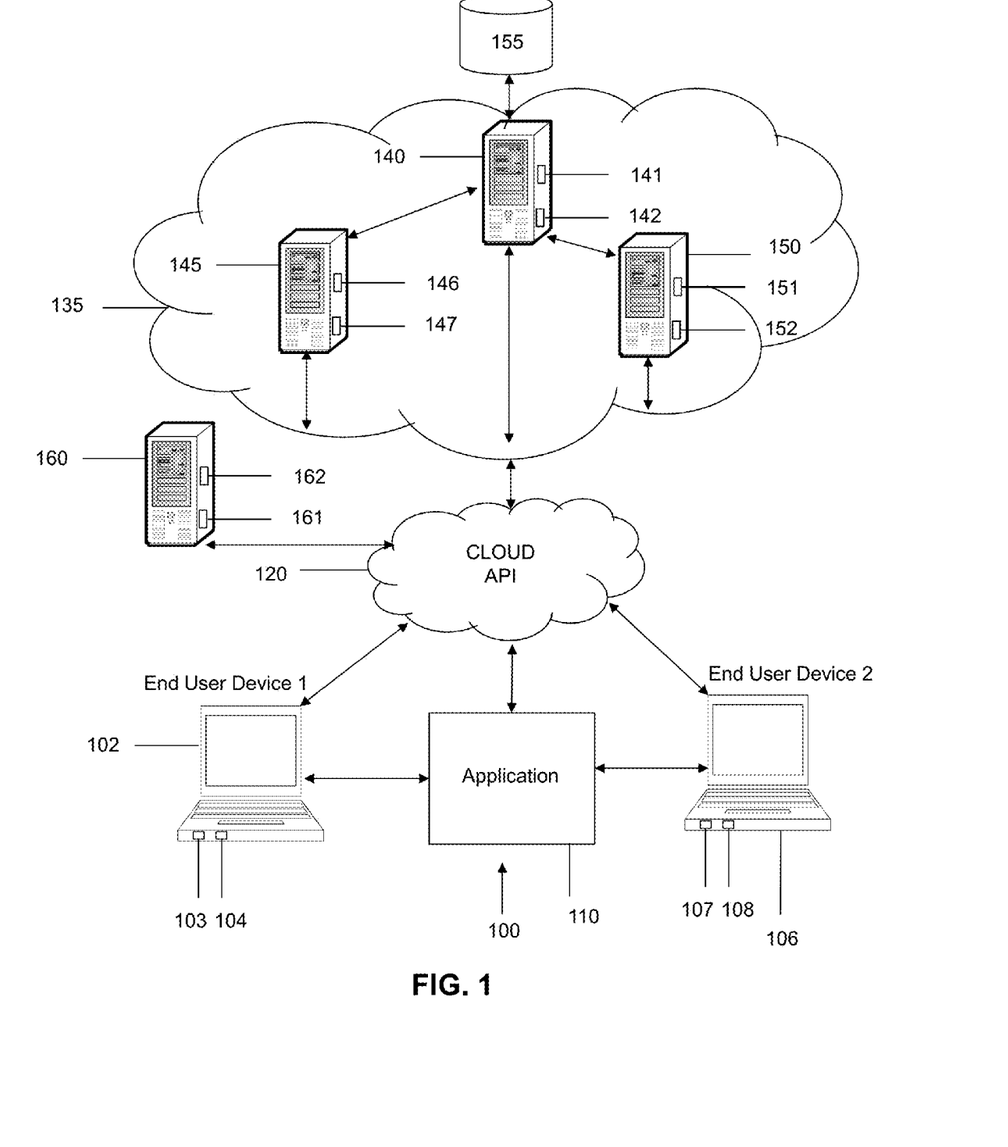
FIG. 1 is a schematic diagram of a system for processing requests handled by an application programming interface according to an embodiment of the present disclosure.

After the subset of requests are grouped into the pool of requests, the system 100 may perform a query optimization by combing a set of requests within the pool of requests into a single data base call if the set of requests within the pool of requests was received during a defined time interval. For example, the system 100 may combine a set of requests that call the same function used by a gaming application into a single database call if the requests were all received within a defined time interval. The system 100 may transmit the single call to database 155 or to another system to obtain a result set for the set of requests in the single call. Identifiers that uniquely identify one request from another may be appended into rows in the result set so that a result associated with one request may be distinguished from a result associated with a different request. Then, without having to further access the database 155, the result set may be split based on the identifiers into individualized responses for each of the requests that were originally served to the API 120. The individualized responses may then be transmitted to the corresponding devices that made the original requests that correspond to the responses.

Figure 2:
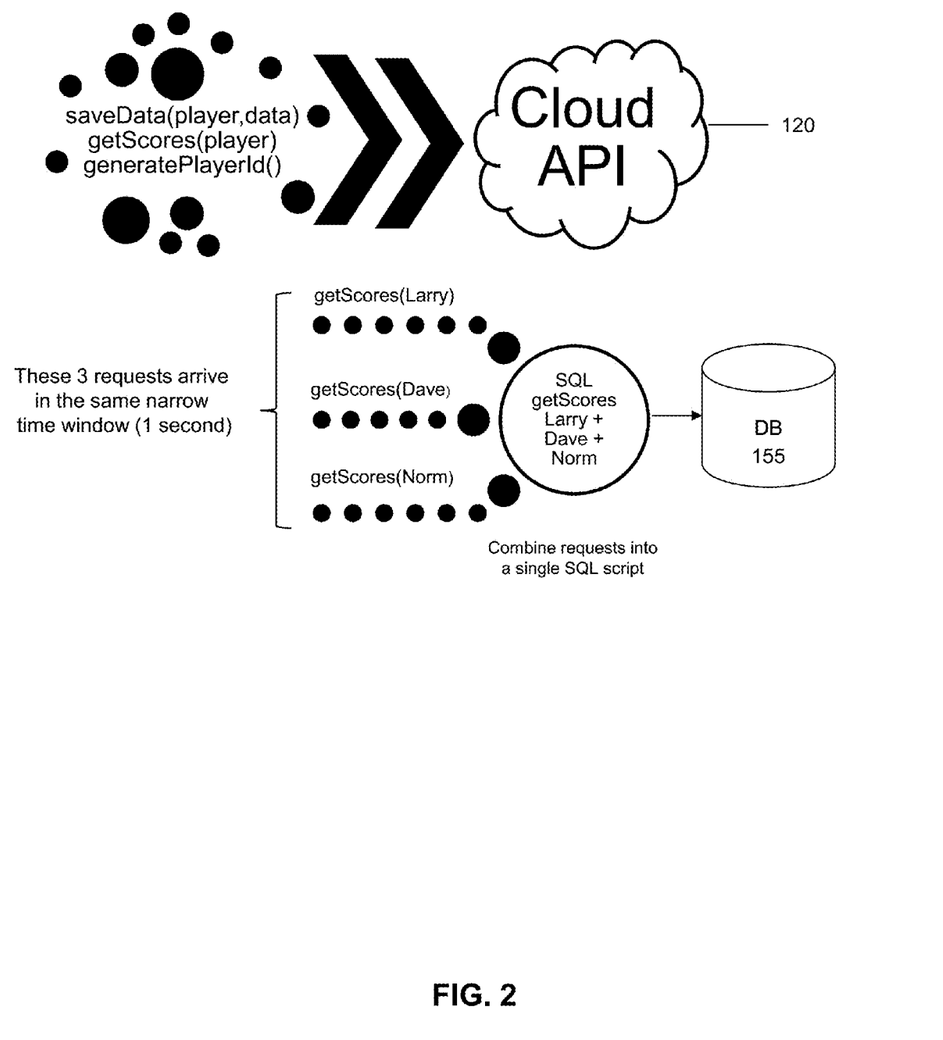
FIG. 2 is a schematic diagram illustrating how requests are received and combined into a set of requests prior to being sent to a database in the system of FIG. 1.
Figure 3:
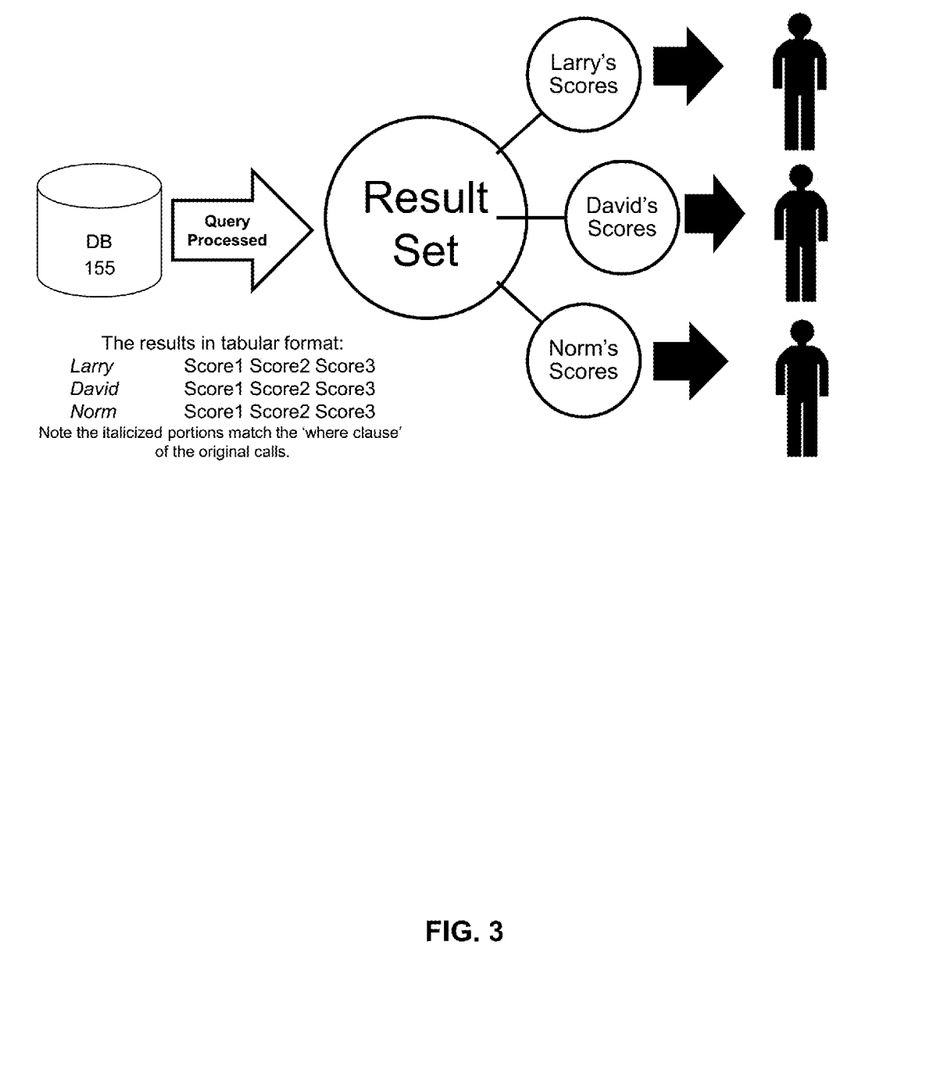
FIG. 3 is a schematic diagram illustrating how the database in the system of FIG. 1 returns a result set in response to receiving the combined requests.

Referring to the drawings and in particular to FIGS. 1-3, the system 100 may provide a more efficient way to process API requests handled by the API 120 by grouping the API requests based on the functions that the API requests call. The system 100 may be configured to support, but is not limited to supporting, content delivery services, cloud computing services, voice-over-internet protocol services (VoIP), software as a service (SaaS) applications, gaming applications and services, productivity applications and services, mobile applications and services, and any other computing applications and services. The system may include one or more end users that may use end-user device 102, end-user device 106, or a combination thereof, to access content, data, and services provided by application 110. In one embodiment, the end-user devices 102 and 106 may be computers, servers, mobile devices, smartphones, computer tablets, or any other computing devices. In one embodiment, the end-user device 102 may include a memory 103 that includes instructions, and a processor 104 that executes the instructions from the memory 103 to perform various operations that are performed by the end-user device 102. The processor 104 may be hardware, software, or a combination thereof. Similarly, end-user device 106 may include a memory 107 that includes instructions, and a processor 108 that executes the instructions from the memory 107 to perform various operations that are performed by the end-user device 106. The processor 108 may be hardware, software, or a combination thereof.

The end users may utilize the end-user devices 102 and 106 to access and interact with the application 110 so as to obtain audio content, video content, text content, image content, gaming content, web content, any other type of content, and information or data associated with the application 110. Additionally, the end users may utilize the end-user devices 102 and 106 to perform a variety of other tasks and functions with respect to the application 110. In certain embodiments, the application 110 may be a software application that may be a gaming application, an internet-based application, a browser application, a mobile application, a productivity application, a video application, a music application, a social media application, a financial application, a news application, or any other type of application. In certain embodiments, at least a portion of the application 110 may be configured to execute directly on the end-user devices 102 and 106, however, in other embodiments, the application 110 may be configured to execute on the other devices and components in the system 100.

The application 110 may utilize various functions hosted by the API 120 to provide additional features and functionality to the end users using the application 110 in an efficient manner. For example, if the application 110 is a gaming application, the API 120 may host functions that return high scores, low scores, user rankings, and other information to the application 110 so that the end-user devices 102 and 106 can access this information. Notably, the functions that the API 120 can host may be unlimited in type and scope. For example, the API 120 may host functions associated with gaming, calculation functions, functions that allocate and manage memory, functions that create, manage, and delete information and files, functions associated with generating visual and auditory content, functions associated with updating information, messaging functions, or any other types of functions that the application 110 may use to support its end users. The API 120 may also be utilized by the application 110 to provide functionality and services that the application 110 does not otherwise provide on its own. In one embodiment, the API 120 may be a software-to-software interface that enables the application 110 to communicate with other applications to provide the services and functionality needed to support the application 110. The API 120 may also include programming instructions and standards that enable the application 110 to access and communicate with one or more other applications in the system 100 or accessible by the system 100.

The API 120 and the functions hosted by the API 120 may be supported and executed by using any combination of the servers 140, 145, and 150 in the communications network 135 or outside of the communications network 135. In one embodiment, the server 140 may include a memory 141 that includes instructions, and a processor 142 that executes the instructions from the memory 141 to perform various operations that are performed by the server 140. Additionally, the server 145 may include a memory 146 that includes instructions, and a processor 147 that executes the instructions from the memory 146 to perform various operations that are performed by the server 145. Furthermore, the server 150 may include a memory 151 that includes instructions, and a processor 152 that executes the instructions from the memory 151 to perform various operations that are performed by the server 150. The processors 142, 147, and 152 may be hardware, software, or a combination thereof. In certain embodiments, the servers 140, 145, and 150 may be network servers, routers, gateways, computers, mobile devices, or any other suitable computing device.

The communications network 135 of the system 100 may be configured to link each of the devices in the system 100 to one another, and be configured to transmit, generate, and receive any information and data traversing the system 100. In one embodiment, the communications network 135 may include any number of additional servers in addition to the server 140, the server 145, and the server 150. The communications network 135 may also include and be connected to a wireless network, an ethernet network, a satellite network, a broadband network, a cellular network, a private network, a cable network, the Internet, an internet protocol network, a multiprotocol label switching (MPLS) network, a content distribution network or any combination thereof. In one embodiment, the communications network 135 may be part of a single autonomous system that is located in a particular geographic region, or be part of multiple autonomous systems that span several geographic regions.

The database 155 of the system 100 may be utilized to store and relay information that traverses the system 100, cache content that traverses the system 100, store data about each of the devices in the system 100, and perform any other typical functions of a database. In one embodiment, the database 155 may be connected to or reside within the communications network 135. Additionally, the database 155 may include a processor and memory or be connected to a processor and memory to perform the various operation associated with the database 155. In one embodiment, the database 155 may be connected to the servers 140, 145, and 150, server 160, API 120, application 110, and end-user devices 102 and 106. The database 155 may also store information relating to the requests traversing the system 100, data relating to the functions hosted by the API 120, and data responsive to the requests traversing the system 100. Furthermore, the database 155 may be configured to process queries sent to it by the API 120 or by any other device in the system 100.

Operatively, the system 100 may process requests handled by the API 120 in a manner that helps to reduce the need for hardware expansion or network build-outs. In an example scenario, the end-users using end-user device 102 and 106 may interact with application 110, which may be a gaming application or any other type of application. The application 110 may have a user interface that generates visual and auditory feedback to the end-users when the end-users interact with the application 110. Also, if the application 110 is a gaming application, the application 110 may enable the users to save user profile information, obtain high scores and low scores, chat with one another through the use of a chat function, save their progress through the game, pause the game, restart the game, or access any other functionality of features of traditional gaming applications. Various functions of the application 110 may be outsourced to and hosted by the API 120. The API 120, for example, may host a saveData function, which allows end users to save player data associated with the application 110 and includes parameters "player" and "data;" a getScores function, which allows an end user to retrieve a high score, and includes a "player" parameter; a chat function, which enables the end user to chat in the applications; an update function, which allows an end user to make an update in the application 110; and a generatePlayerID function, which enables an end user to create a player identifier for uniquely identifying the end user in the application 110. Of course, the API 120 can host any other desired or contemplated function that the application 110 could utilize.

If a first end user using end-device 102 and a second end user using end-device 106 are both attempting to retrieve their high scores via the getScores function, the application 110 may send requests for each of the end users to the API 120 to process the requests for the getScores function. These requests may enter a queue, along with a multitude of other requests from other end users, to be handled by the API 120. Instead of simply processing the plurality of requests on a first-in first-out (FIFO) basis or by using some other processing scheme, a priority level may be assigned by the system 100 to each of the requests based on which functions the requests call. For example, requests for getScores function may be assigned a higher priority level in the queue than requests for the saveData function. From here, the API 120 may separate or otherwise group a subset of requests of the plurality of requests that call the same function or similar functions hosted by the API 120. For example, if the request from end-user device 102 and the request from end-user device 106 both call the high score function hosted by the API 120, the system 100 may pool these two requests into a separate pool of requests. Similarly, if a third user sends in a request for a similar function that would return a similar result set as the high score function, sends in a request for a similar function that would have a similar function type as the high score function, or calls a function that could otherwise be processed with the high score function, the third user's request may also be combined into the separate pool of requests. For example, if the third user calls the saveData function and this function can be processed with the getScores function, the third user's request may be combined with the requests from the end-user device 102 and end-user device 106. If a group of other users send in requests for the update function and the update function is not combinable with the getScores function, then those requests may be placed in a separate pool from the pool of requests associated with the getScores function.

In one embodiment, a function may be similar to another function if one function has at least one parameter in common with another function. In another embodiment, a function may be similar to another function if one function would produce the same results another function. In another embodiment, a function may be similar to another function if one function has a code structure that is at least thirty percent the same as the code structure for another function. In another embodiment, a function may be similar to another function if one function has a portion of code structure that matches a portion of code structure in another function. In another embodiment, a function may be similar to another function if one function performs the same operations as another function. In another embodiment, a function may be similar to another function if one function adjusts or retrieves the same data as another function.

Once the plurality of requests are separated into different pools of requests based on which functions the requests call, the system 100 may determine if requests within each of the pools of requests were received during a defined time interval, and then combine the requests received during the time interval into a set of calls, such as database calls. The number of calls in the set of calls may be less than the number of requests within each pool of requests that were received during the defined time interval. In at least one embodiment, the requests within the pool of requests received during the time interval may be combined into a single call. For example, the system 100 may perform a query optimization by combining all requests that call the getScores function within the last one second of time into a set of calls, which may be a single call. As a further example and referring to FIG. 2, end users Larry, Dave, and Norm all had requests that called the getScores function. Each of these requests from Larry, Dave, and Norm may be combined by the system 100 into a single call or single structured query language (SQL) script. The single call or SQL script containing the requests from Larry, Dave, and Norm may be pushed or otherwise transmitted by the system 100 to the database 155 so that the database 155 can return the result set associated with the requests in the single call.

Referring now also to FIG. 3, once the database 155 receives the single call containing the requests from Larry, Dave, and Norm, the database 155 can process the call and return a result set in a tabular format or other desired format. The result set can include all of the results requested in the single call. In order to distinguish one result from another in the result set, the system 100 may append the original WHERE clauses associated with each request to each resultant row generated in the result set table. In one embodiment, unique identifiers that identify one request from another request may be appended to the rows in the result set table as well. Now, without having to re-access the database 155, the system 100 can split the result set off into individual responses for each of the corresponding requests that were originally sent into the API 120. The system 100 may then transmit the individual responses the appropriate end users. For example, in FIG. 3, the cumulative result set including the high scores requested by Larry, Dave, and Norm was split into individual responses for Larry, Dave, and Norm. The system 100 may then transmit the individualized responses to Larry, David and Norm separately via the application 110. The application 110 may then render their corresponding high scores returned from the getScore function on each of their devices separately. Notably, the processes described herein may be applied to any type of function and for any type of application 110. Additionally, the processes described herein may allow for combining requests that call functions that are not identical, but are similar in type. For example, CREATE, DELETE, and MODIFY queries of the same type may be combined to save database runtime. Furthermore, requests may be combined based on what database tables they will access and what SQL functions they will employ.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, grouping a subset of requests of a plurality of requests into a pool of requests if the subset of requests call similar functions, combining a set of requests within the pool of requests into a set of calls if the set of requests in the pool of requests are received during a specified time interval, transmitting the set of calls to database 155 to obtain a result set for the set of requests in the set of calls, generating the result set, receiving the result set, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including an end-user device 102, end-user device 106, application 110, API 120, communications network 135, server 140, server 145, server 150, server 160, and database 155. However, the system 100 may include multiple end-user devices 102 and 106, multiple applications 110, multiple APIs 120, multiple communications networks 135, multiple servers 140, 145, 150, and 160, multiple databases 155, or any number of any of the other components in the system 100. Furthermore, in one embodiment, substantial portions of the functionality and operations of the system 100 may be performed by other networks and systems that are connected to system 100.

Figure 4:
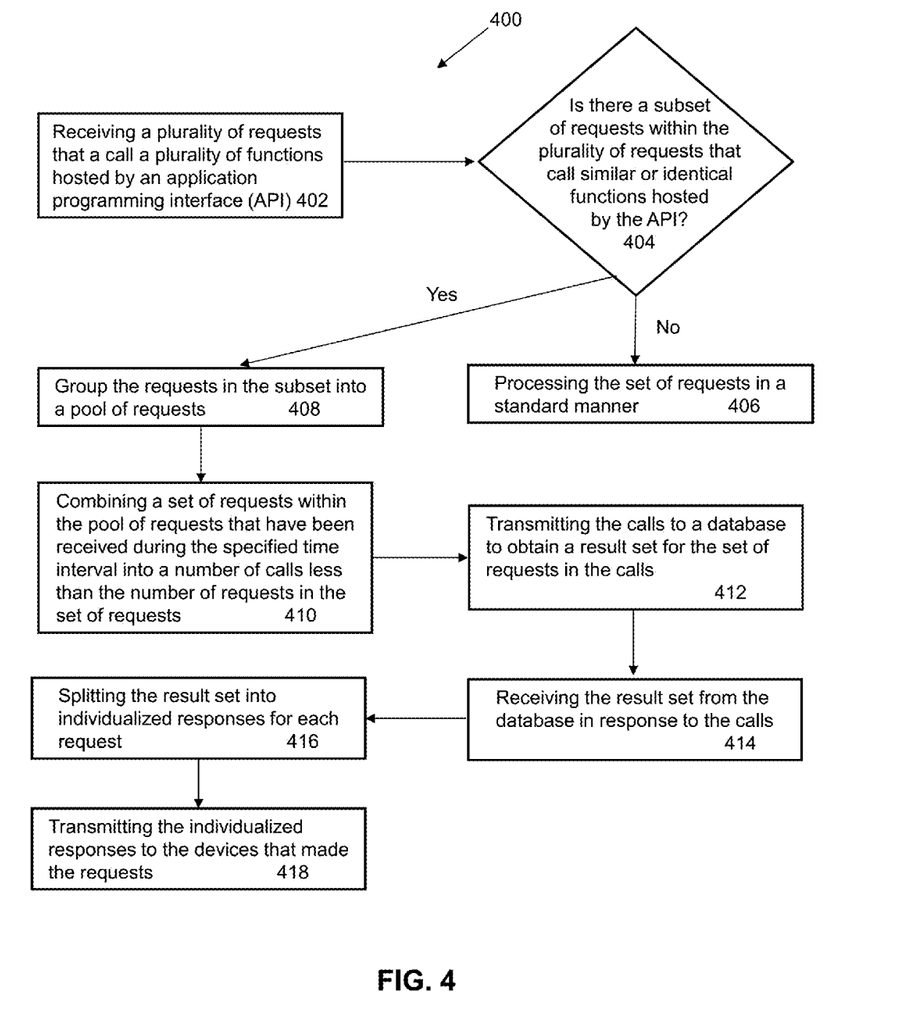
FIG. 4 is a flow diagram illustrating a sample method for processing requests handled by an application programming interface according to an embodiment of the present disclosure.

As shown in FIG. 4, an exemplary method 400 for processing requests handled by an API 120 is schematically illustrated, and may include, at step 402, receiving a plurality of requests that call one or more functions hosted by the API 120. The plurality of requests may be associated with various features and functions of an application 110. In certain embodiments, the plurality of requests may be received by the API 120 from the end user devices 102 and 106 via the application 110 or directly from the end user devices 102 and 106. At step 404, the method 400 may include determining if there is a subset of requests within the received plurality of requests that call similar functions, identical functions, or a combination thereof, that are hosted by the API 120. In one embodiment, the determination may be performed by the API 120, the servers 140, 145, and 150, the server 160, any combination thereof, or other appropriate device.

If it is determined that there is no subset of requests within the received plurality of requests that call similar functions, identical functions, or a combination thereof, then the method 400 may include, at step 406, processing the plurality of requests in a standard manner, such as via a traditional priority queue. However, if there is a subset of requests within the received plurality of requests that call similar, identical functions, or a combination thereof, then the method 400 may include, at step 408, grouping the subset of requests that call the similar functions, identical functions, or a combination thereof, into a pool of requests. In one embodiment, the grouping of the subset of requests into the pool of requests may be performed by the API 120, the servers 140, 145, and 150, the server 160, any combination thereof, or other appropriate device. At step 410, the method 400 may include combining a set of requests within the pool of requests that have been received during a defined time interval into a set of calls, such as database calls. The number of calls in the set of calls may be less than the number of requests within the pool of requests that were received during the defined time interval. In at least one embodiment, the requests within the pool of requests received during the time interval may be combined into a single call. In one embodiment, the combining of the set of requests within the pool of requests that were receiving during the time interval may be performed by the API 120, the servers 140, 145, and 150, the server 160, any combination thereof, or other appropriate device.

At step 412, the method 400 may include transmitting the set of calls to database 155 or other appropriate device to obtain a result set for the set of requests in the set of calls. In one embodiment, the transmission of the set of calls may be performed by the API 120, the servers 140, 145, and 150, the server 160, any combination thereof, or other appropriate device. At step 414, the method 400 may include receiving the result set from the database 155 or other appropriate device in response to the set of calls. In one embodiment, the result set may be received from the database 155 by the API 120, the servers 140, 145, and 150, the server 160, any combination thereof, or other appropriate device. At step 416, the method 400 may include splitting the result set into individualized responses corresponding to each of the individual requests in the set of calls. In one embodiment, the splitting of the result set may be performed by the API 120, the servers 140, 145, and 150, the server 160, any combination thereof, or other appropriate device. Notably, the splitting of the result set may be performed without have to re-access the database 155. At step 418, the method 400 may include transmitting the individualized responses to the end-user device 102 and 106 either directly or via the application 110. In one embodiment, the transmitting of the responses may be performed by the API 120, the servers 140, 145, and 150, the server 160, any combination thereof, or other appropriate device.

In one embodiment, the system 100 and methods disclosed herein may include assigning a priority level to each request based on the type of function a request calls, the device that made the request, the type of information the request is seeking, the type of information that the request is trying to update, the type of application that is making the request on behalf of the end user, or based on other desired factors. The requests may be processed by the system 100 based on the priority level assigned to the requests. For example, high priority requests may be processed prior to low priority requests or medium priority requests.

In one embodiment, the system 100 and methods may include receiving the result set in a table format or other desired format. In another embodiment, the system 100 and methods disclosed herein may include splitting the result sets based on WHERE clauses or identifiers appended to each row of the result set table. By appending WHERE clauses or identifiers to each row of the result set table, one request may be uniquely identified from another request so that the result set may be effectively split by the system 100. Once the result set is split and the individualized responses are generated, the responses may be sent to the appropriate devices that sent the original requests to the API 120. In one embodiment, the system 100 and methods described herein may further include utilizing any of the various components described in the system 100 to perform the operative functions disclosed herein.

It is important to note that the methods described above may incorporate any of the functionality, devices, and/or features of the system 100 and subsystems described above, or otherwise, and are not intended to be limited to the description or examples provided herein.

Figure 5:
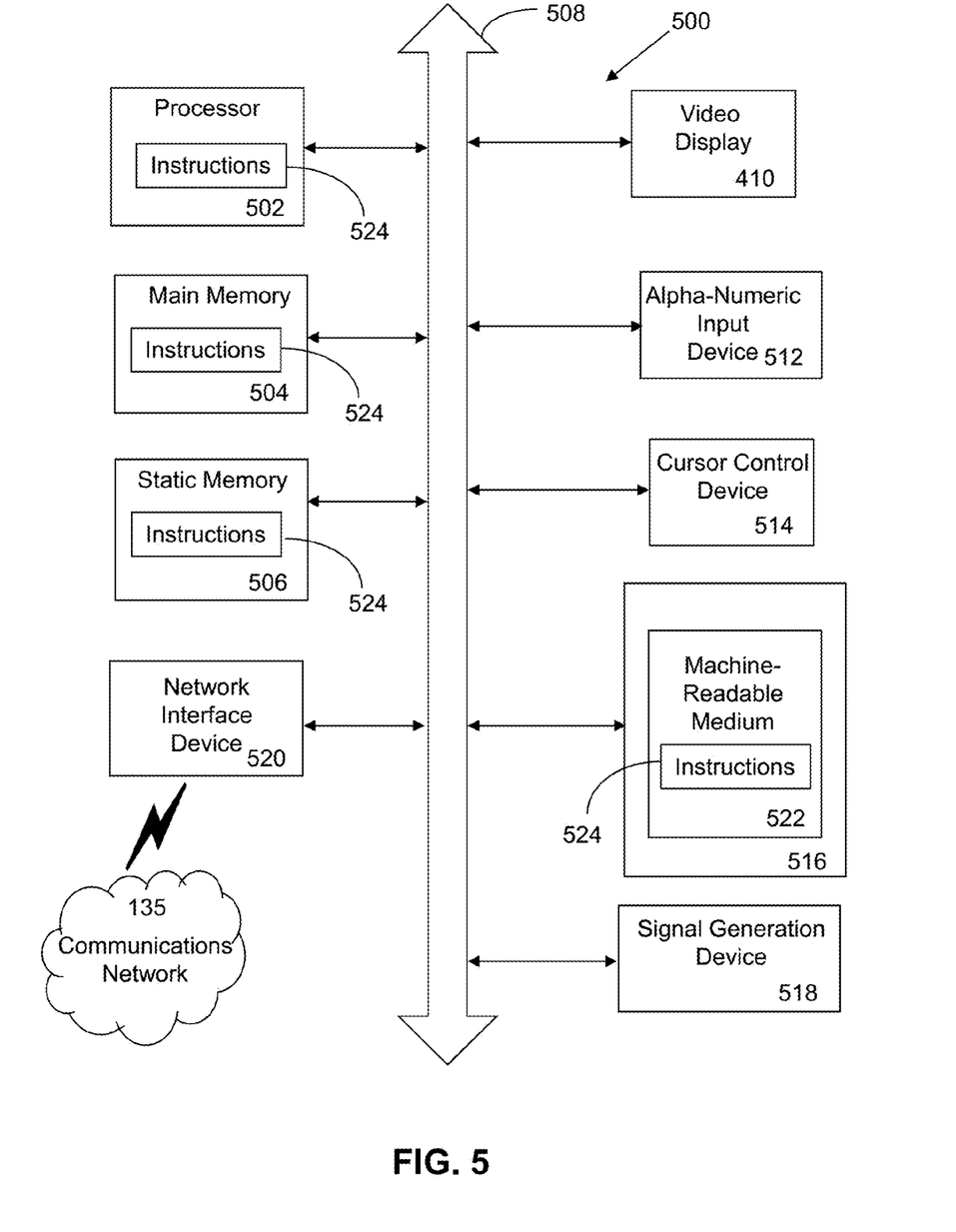
FIG. 5 is a schematic diagram of a machine in the form of a computer system within which a set of instructions, when executed, may cause the machine to perform any one or more of the methodologies or operations of the systems and methods for processing requests handled by an application programming interface.

Referring now also to FIG. 5, at least a portion of the methodologies and techniques described with respect to the exemplary embodiments of the system 100 can incorporate a machine, such as, but not limited to, computer system 500, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines, such as, but not limited to, the end-user device 102, end-user device 106, the server 140, the server 145, the server 150, the database 155, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510, which may be, but is not limited to, a liquid crystal display (LCD), a flat panel, a solid state display, or a cathode ray tube (CRT). The computer system 500 may include an input device 512, such as, but not limited to, a keyboard, a cursor control device 514, such as, but not limited to, a mouse, a disk drive unit 516, a signal generation device 518, such as, but not limited to, a speaker or remote control, and a network interface device 520.

The disk drive unit 516 may include a machine-readable medium 522 on which is stored one or more sets of instructions 524, such as, but not limited to, software embodying any one or more of the methodologies or functions described herein, including those methods illustrated above. The instructions 524 may also reside, completely or at least partially, within the main memory 504, the static memory 506, or within the processor 502, or a combination thereof, during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 522 containing instructions 524 so that a device connected to the communications network 135, other network, or both, can send or receive voice, video or data, and to communicate over the communications network 135, other network, or both, using the instructions. The instructions 524 may further be transmitted or received over the communications network 135, other network, or both, via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The terms "machine-readable medium" or "machine-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium" or "machine-readable device" may be non-transitory. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions;
   a processor that executes the instructions to perform operations, the operations comprising:
   receiving a plurality of requests that each call a function of a plurality of functions;
   assigning a priority level to each request based on a type of device making each request, wherein the priority level indicates a position that each request has in a queue for processing the plurality of requests relative to other requests of the plurality of requests in the queue;
   grouping, based on the priority level assigned to each request, a subset of requests of the plurality of requests into a pool of requests if the subset of requests call similar functions of the plurality of functions, wherein each function of the similar functions is different from other functions of the similar functions, but has a parameter in common with the other functions;
   combining a set of requests of the pool of requests into a set of calls if the set of requests in the pool of requests are received during a time interval;
   transmitting, to a database, the set of calls to obtain a result set for the set of requests in the set of calls; and
   distinguishing each result in the result set from another result in the result set by appending a corresponding where clause associated with each request to each resultant row in the result set.

2. The system of claim 1, wherein the operations further comprise assigning, based on a type of information each request is attempting to update, the priority level to each request.

3. The system of claim 1, wherein the operations further comprise receiving the result set in response to the set of calls.

4. The system of claim 1, wherein the operations further comprise determining that the subset of requests call the similar functions if each function of the similar functions has a portion of code that matches the other functions of the similar functions.

5. The system of claim 1, wherein the operations further comprise splitting the result set into individualized responses corresponding to each of the requests in the set of calls.

6. The system of claim 5, wherein the operations further comprise transmitting the individualized responses to an end-user device.

7. The system of claim 1, wherein the operations further comprise processing the plurality of requests.

8. The system of claim 1, wherein the operations further comprise assigning the priority level to each request based on a function type associated with the function of the plurality of functions.

9. The system of claim 1, wherein the operations further comprise assigning, based on a type of information each request is seeking, the priority level to each request.

10. The system of claim 1, wherein the operations further comprise assigning, based on a type of application making each request, the priority level to each request.

11. The system of claim 1, wherein the operations further comprise determining a number of calls in the set of calls.

12. The system of claim 11, wherein the operations further comprise determining if the number of calls in the set of calls is less than a number of requests in the set of requests in the pool of requests.

13. The system of claim 1, wherein the operations further comprise combining the set of requests of the pool of requests into a single call.

14. A method, comprising:
   receiving a plurality of requests that each call a function of a plurality of functions;
   assigning, by utilizing instructions from a memory that are executed by a processor, a priority level to each request based on a type of information each request is attempting to update, wherein the priority level indicates a position that each request has in a queue for processing the plurality of requests relative to other requests of the plurality of requests in the queue;
   grouping, based on the priority level assigned to each request, a subset of requests of the plurality of requests into a pool of requests if the subset of requests call similar functions of the plurality of functions, wherein each function of the similar functions is different from other functions of the similar functions, but has a parameter in common with the other functions;
   combining a set of requests of the pool of requests into a set of calls if the set of requests in the pool of requests are received during a time interval; and
   transmitting, to a database, the set of calls to obtain a result set for the set of requests in the set of calls; and
   distinguishing each result in the result set from another result in the result set by appending a corresponding where clause associated with each request to each resultant row in the result set.

15. The method of claim 14, further comprising assigning, based on a type of device making each request, the priority level to each request.

16. The method of claim 14, further comprising assigning, based on a type of information each request is seeking, the priority level to each request.

17. The method of claim 14, further comprising assigning, based on a type of application making each request, the priority level to each request.

18. The method of claim 14, further comprising determining a number of calls in the set of calls.

19. The method of claim 18, further comprising determining if the number of calls in the set of calls is less than a number of requests in the set of requests in the pool of requests.

20. A non-transitory computer-readable device comprising instructions, which when executed by a processor, cause the processor to perform operations comprising:

receiving a plurality of requests that each call a function of a plurality of functions;

assigning a priority level to each request based on a type of application making each request, wherein the priority level indicates a position that each request has in a queue for processing the plurality of requests relative to other requests of the plurality of requests in the queue;

grouping, based on the priority level assigned to each request, a subset of requests of the plurality of requests into a pool of requests if the subset of requests call similar functions of the plurality of functions, wherein each function of the similar functions is different from other functions of the similar functions, but has a parameter in common with the other functions;

combining a set of requests of the pool of requests into a set of calls if the set of requests in the pool of requests are received during a time interval;

transmitting, to a database, the set of calls to obtain a result set for the set of requests in the set of calls; and distinguishing each result in the result set from another result in the result set by appending a corresponding where clause associated with each request to each resultant row in the result set.

* * * * *